United States Patent

[11] 3,566,071

[72] Inventors Richard L. Matchett
Bethel Park;
George Burton, Jr., Greensburg; James F. Smith, Snowden Township; William L. Frankhouser, Irwin, Pa.
[21] Appl. No. 586,613
[22] Filed Oct. 12, 1966
[45] Patented Feb. 23, 1971
[73] Assignee Westinghouse Electric Corporation
Pittsburgh, Pa.
Continuation-in-part of application Ser. No. 511,275, Oct. 23, 1965, now abandoned, which is a continuation of application Ser. No. 53,302, Aug. 31, 1960, now abandoned

[54] METHOD OF METALS JOINING
3 Claims, 22 Drawing Figs.
[52] U.S. Cl. .............................................. 219/121
[51] Int. Cl. .............................................. B23k 15/00
[50] Field of Search ................................. 219/121
(EB), 50, 69, 117, 121, 124, 137, (Inquired); 250/49.5 (O)

[56] References Cited
UNITED STATES PATENTS
1,933,340 10/1933 Raymond ............... 219/124
2,932,720 4/1960 Stohr ...................... 219/121
2,987,610 6/1961 Steigerwald ............ 219/121
2,989,614 6/1961 Steigerwald ............ 219/121
3,020,387 2/1962 Basche et al. .......... 219/121
3,033,974 5/1962 Schleich et al. ........ 219/121
3,093,726 6/1963 Burton et al. ........... 219/121

OTHER REFERENCES
"Welding, Drilling and Machining by Electron Beam Bombardment," American Machinist, February 23, 1959, Pages 126—132 (copy found in Group 213, Class 219— 121)

Primary Examiner—J.V. Truhe
Assistant Examiner—J.G. Smith
Attorneys—C.L. Freedman, A.T. Stratton and Hymen Diamond ABSTRACT: A process of joining metals by directing a focused electron beam on a joint to be welded and by moving the beam longitudinally of the joint whereby the adjoining walls of the work are melted and flow together to form a seam weld. The intensity of the beam is sufficient to penetrate to a depth which is substantially greater than the width of the melted portion to produce a deep narrow weld. If spot welds are desired the step of moving may be omitted. Along with the steps above recited the beam may be oscillated back and forth across the joint with a magnitude of the beam traversed small relative to the depth that the beam penetrates the work. All of the foregoing steps are preferably performed in a vacuum.

PATENTED FEB 23 1971

INVENTORS
Richard L. Matchett, George Burton Jr.,
James F. Smith and William L. Frankhouser.
BY
Hymen Diamond
ATTORNEY N= Number of Tracks
$\bar{X}$= Average for All Channels
S= Deviation

METHOD OF METALS JOINING

This application is a continuation of application Ser. No. 511,275, filed Oct. 23, 1965 by Richard L. Matchett, George Burton, Jr., James F. Smith and William L. Frankhouser and now abandoned, which in turn is a continuation of parent application Ser. No. 53,302, filed Aug. 31, 1960 by Richard L. Matchett, George Burton Jr., James F. Smith, and William L. Frankhouser and also now abandoned.

This invention relates to the art of metals joining and has particular relationship to metals joining in the fabrication of assemblies, the dimensions of which must be maintained within close tolerances. The operation which constitutes the subject matter of this invention may be aptly described as precision metal joining.

While in its broader aspects this invention has wide applicability, in its specific aspects it is particularly suitable for metals joining in the assembly of heat exchangers, the dimensions of which must be maintained closely. Typically, such a heat exchanger may be made up of an array of strips, each in the form of a small I-beam, joined along the flanges. Each strip may be between 30 inches and 100 inches long and may have a width of about 3 inches. The flange thickness of each strip may be about .15 inch and the width about .092 inch. The assembly is made up by mounting the strips with the flanges of adjacent strips abutting and welding along the joints of the flanges. Between the webs of the strips, channels for a heat exchange fluid such as water are then formed. Each of these channels is bounded by webs and flanges of adjacent strips. A heat-generating material is embedded in each web of each strip. The heat generated by this material is transferred to the fluid; the fluid may drive power-generating equipment.

It is essential that the welds be sealed fluidtight and this demands that the penetration of the welds be substantially 100 percent. Attempts to maintain the penetration 100 percent may result in the penetration of weld metal through the joints and in the formation of undesired compounds (for example oxides) on heat transfer surfaces of the channels. Such formations may introduce irregularities in the transfer of heat along different parts of the heat transfer surfaces and in corrosion by the fluid. Hot spots are produced by the heat-generating material and the material itself may be damaged. To avoid hot spots it is also necessary that the dimensions of the water channels be maintained precisely.

In addition, the strips which make up the heat exchanger assembly are composed of such reactive materials as zirconium. In welding these materials it is essential that any oxidation of the welded joints be avoided. Oxidized regions are corroded by the heat transfer fluid which is usually highly corrosive.

Prior to this invention, it was the practice to form these heat exchanger assemblies by welding with a nonconsumable electrode usually of tungsten in a chamber in an atmosphere of highly pure inert gas, usually specially purified helium or argon. This practice was applied extensively and many successful assemblies were fabricated in this way. But this method of welding has important disadvantages. Because the assemblies are of unusual form with long and narrow heat transfer channels and because the assemblies are made up of strips of unusual form, long and narrow I-beams, the proper maintenance of the dimensions of the assembly when it is being fabricated is difficult. The welding arc extends over a substantial area around the point being welded and the heat of the arc tends to deform the heat transfer channels and the overpenetration (drop through of melted metal) tends to cover the heat transfer surfaces. The arc produces a relatively large heat affected zone and this also tends to introduce deformation in the assembly. Unusual and costly measures must be taken to prevent the deformation. Costly salvage operations for unacceptable over and under penetration are also eliminated. The highly purified gas is costly and sometimes scarce.

It is accordingly broadly an object of this invention to provide a method of metals joining particularly suitable for metals joining in the fabrication of heat exchangers of the type just described which shall not have the disadvantages of the nonconsumable electrode high-purity-inert-gas shielded welding method just discussed.

Another object of this invention is to provide a high precision method of metals joining.

An additional object of this invention is to provide a method of welding in the practice of which it shall be possible to produce welds having a high depth-to-width ratio.

An ancillary object of this invention is to produce a novel heat exchanger.

Attempts have been made to improve over the nonconsumable electrode inert-gas shielded methods by welding with an electron beam. But such attempts have proved unsatisfactory. The joints produced have had about the same properties as the joints produced with the nonconsumable electrode inert-gas welding method and the welding with an electron beam has given rise to about the same problems as had existed in the case of the nonconsumable electrode method.

It is then a specific object of this invention to provide a method of metals joining by means of an electron beam which shall lend itself readily to the high precision joining necessary in the fabrication of the above-described heat exchangers and which shall not have the disadvantages of the nonconsumable electrode method.

This invention arises from the discovery that the prior-art methods of electron-beam welding failed because the electron beam had neither the concentration nor the penetration necessary to achieve the desired precision. In electron-beam welding or joining in accordance with the teachings of the prior art, the beam voltage was of the order of 30,000 volts and the beam was projected without critical focusing on the joint being welded such as to achieve significant concentration of the beam. The resulting weld was then of substantial width and the ratio of the depth to the width was relatively low. Such a weld has a large heat-affected area and gives rise to distortion, and other undesirable results.

In arriving at this invention, it was realized that to attain the proper precision it is necessary that the welding be carried out in such manner that the depth-to-width ratio of the weld be relatively high and in accordance with this invention a high ratio is obtained by welding with a concentrated electron beam. It was found that in welding in this way the dimensions can be maintained in the same way as they are maintained in a machine operation.

In accordance with this invention the joining is effected by the thermal energy produced by a critically focused beam of electrons impinging on the surface of the work being joined. The weld is made in a vacuum of less than about 5.0 microns of mercury pressure and is capable of producing a weld of greater depth than width by a factor of as much as 20:1 in some materials. Substantially less total-energy input to the work to produce a given weld penetration is required than in arc welding or prior-art electron-beam welding techniques. The electron-beam welding process in accordance with this invention is also capable of precise control of all of the welding variables. The joint is free from electrode contamination encountered in prior-art welding and a high-purity joint in the welding of reactive materials is achieved without costly inert-gas shielding atmospheres. The original chemical composition of the materials being welded is readily maintained.

Specifically, electron-beam welding in accordance with this invention is a welding process, performed in a vacuum, which utilizes a collimated, focused stream of electrons directed upon the surface of the work pieces being joined. The electrons originate as a cloud about a heated filament and are transformed into a critically concentrated beam by the use of appropriate orificing diaphragms, electrostatic focusing electrodes, and electromagnetic, electrostatic, or permanent magnetic lenses.

The electron-beam diameter near the point where it impinges on the work should be as small as practicable. Electron-beam diameters, from 0.020 to 0.005 inch or less, have been employed in the practice of the invention, usually the diameter of the beam should be of the order of .010 inch. In the practice of this invention it has been found that the focal point (crossover point) of the beam should be precisely set with reference to the surface being welded in a manner dependent on the material being welded and thickness of the work. The beam voltage should be high, voltages as high as 50 kv. to 150 kv., with a current as great as 20 milliamperes have been used in the practice of the invention. Within these limits of operation weld penetration of from 0.005 to 0.500 inch has been obtained in zirconium-base alloys, and deeper penetrations are anticipated. Depth-to-width ratios have been obtained from 1:1 to 20:1 in various materials in the practice of the invention. Welds have been produced in ZIRCALOY-2 alloy, hafnium, copper, carbon alloy steels, tungsten, niobium, stainless steels and other materials.

The unique feature of electron-beam welding at 50 to 150 kv. is the extreme depth-to-width ratio of the weld fusion zone. This was a wholly unexpected result of the application of a stream of electrons to produce thermal effects. Previous attempts to weld with an electron beam at 30 kv. or less resulted in a fusion zone comparable to that attainable by other methods of metal-arc welding. Deep and narrow fusion zones were achieved with a highly concentrated beam of electrons by focusing at high electrical potential. It is this specific property of electron-beam welding which is utilized in component fabrication to produce a superior end product where precision of the dimensions of the ultimate fabricated product is demanded.

As a result of the restricted weld-fusion zone width, both lateral and transverse weld shrinkage can be minimized. Whereas in other forms of welding there is 0.010—0.012 inch transverse shrinkage per seam during longitudinal welding of assemblies, electron-beam welding produces only 0.002-—0.003 inch for a 0.100 inch penetration of weld. Because of this relatively small shrinkage, the dimensional control over the welded product is superior to that of other processes. Tolerances comparable to those employed in standard machining practice, that is ±0.003 inch, are readily maintained.

Two other significant advantages of the application of electron-beam welding to precision welding or joining are (a) reduced heat input to the work, and (b) freedom from the effects of small variations in the chemical analysis of the material being welded. The former is the result of the extreme concentration of energy within an area less than about 0.010 inch diameter. No other welding process is capable of as great a concentration of energy. The latter effect results from the complete independence of the source of the electron beam from the workpiece. Other welding processes require the work to become a part of the electrical welding circuit and thus changes in the chemical content of the work affect the temperature of the arc produced and ultimately the quality of the weld achieved.

Another advantage of the invention is that it affords the facility for welding in a dynamic vacuum. The degree of evacuation serves as a safety factor in that a rise in the chamber pressure causes an electrical discharge within the electron beam column. This discharge acts as an electronic safety mechanism by extinguishing the electron beam thus preventing the welding of parts in a contaminated atmosphere even if the contamination is slight. This effect occurs at about 5 microns. Welding in a dynamic vacuum also assures that the products of out-gassing of the work are not redeposited on the work. Further enhancement of the purity of the welded product is accomplished by virtue of complete freedom from electrode contamination, a detrimental characteristic of other welding methods. The electron beam is projected upon the work from a heated filament in the absence of an electrode.

In the specific application to precision welding of such components as heat exchangers and in welding ZIRCALOY alloy structural sections, such as boxes, shells, brackets, and rods, these features provide several related advantages which had not been apparent previously, but which have been confirmed by actual construction and testing of assemblies.

1. Less distortion in complex weld assemblies. Thus, the usual straightening and machining operations, and also annealing, can be eliminated. If the annealing is eliminated, it is possible to weld previously corrosion-tested components with the corrosion film intact and to eliminate all subsequent corrosion testing.
2. Maintenance of a dynamic vacuum for electron-beam welding assures contamination-free welds since the electron beam would extinguish itself under greater than 5 microns mercury pressure. Thus, the need for corrosion testing subsequent to welding can be eliminated.
3. For heat exchanger welding, the water-channel spacers required in welding in accordance with the teachings of the prior art to maintain satisfactory channel dimensional tolerances during welding and annealing can be eliminated.
4. An advantage achieved through the reduction in distortion is the ability to join structural extensions on the exchanger portion and to weld the exchangers and structural elements during a single chamber evacuation. (Current practice requires arc welding the exchanger section, straightening, annealing, machining, welding on the brackets, restraightening, annealing and machining.)
5. In box and shell structures the reduced distortion may permit elimination of the costly size-annealing operations previously accomplished by stretching into shape around mandrels.
6. Reduced size of the electron-beam weld zone makes it possible to isolate the heat-affected zone of the weld from heat transfer surfaces of the exchanger. Since the heat-affected zone is subject to accelerated attack during corrosion testing or operation, it cannot be tolerated on heat transfer surfaces, because of the impairment of heat transfer properties and the attendant reduction in effective cladding thickness. By isolating the heat-affected zone from heat transfer surfaces, it is possible to assemble and weld previously corrosion tested elements.
7. Reduced size of the weld puddle makes weld penetration control more precise. In exchangers it may be possible to reduce the width of the "weld-free zone" ordinarily required between the edge of the heat-producing elements and underside of the weld over penetration. It is then possible by electron-beam welding to increase the loading of heat-producing elements in heat exchangers. This total allowance is usually of the order of 0.050 inch (0.025 inch per side). Often costly repair operations for overpenetration or extra inspection for underpenetration are necessary in arc-welded assemblies.
8. In the case of welding structural pieces and in joining brackets to assemblies it is possible to eliminate weld backups which are required to confine overpenetration obtained in arc welding. Elimination of the backups eliminates another constant source of difficulty, i.e., contamination of weld metal by the backup material (usually copper).
9. A cost analysis comparing the electron-beam process in accordance with this invention with the nonconsumable electrode process has revealed that the use of the process according to this invention in the making of heat exchangers effects an overall saving of 4.6 percent. One of the items which contributes to this saving is a saving of 39 percent in direct labor.

The novel features considered characteristic of this invention are disclosed generally above. This invention, together with the objects and advantages thereof, will be understood in detail from the following description of apparatus with which this invention is practiced, taken in connection with the accompanying drawings, in which:

FIG. 11b shows the dimensions of the I-beam strips which are joined in making the heat exchanger shown in FIG. 11a;

FIG. 12b is a photograph of a section through a portion of the heat exchanger corresponding to FIG. 12a;

Figure 4:
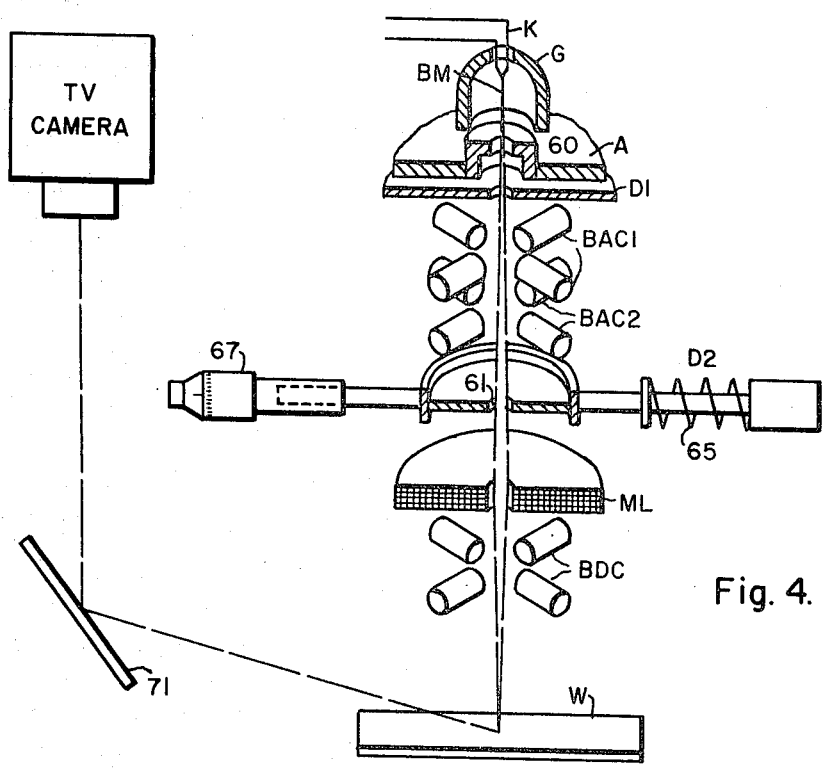
FIG. 4 is a diagrammatic view showing the electron-beam apparatus with which this invention is practiced.
Figure 15:
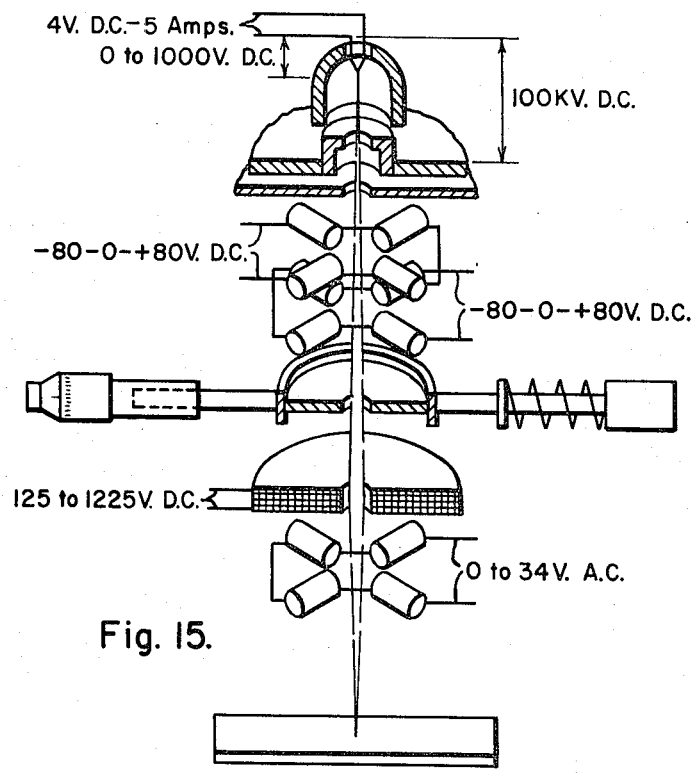

FIGS. 14a through 14e are distribution charts comparing the precision of heat exchangers made in accordance with the teachings of the prior art and heat exchangers made in the practice of this invention; and FIG. 15 is a diagrammatic view similar to FIG. 4 but showing the voltages impressed on the various components in the practice of this invention. FIG. 15 is presented for the purpose of aiding those skilled in the art in practicing this invention and not with any intention of in any way limiting the scope of this invention.

Figure 1:
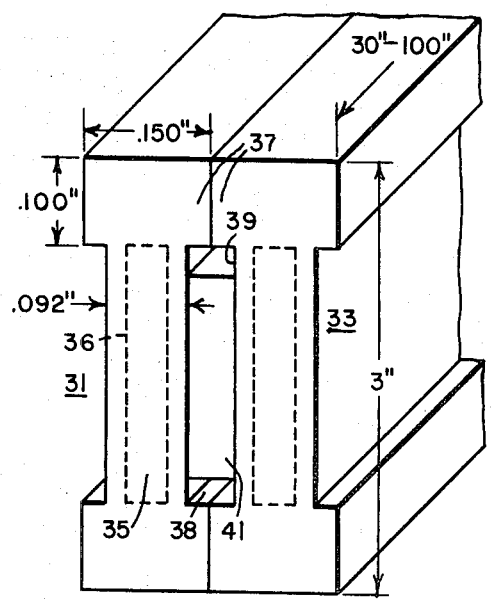
FIG. 1 is a view in isometric of a fluid channel of a heat exchanger to the making of which this invention is particularly applicable.

FIG. 1 shows a portion of a heat exchanger to which this invention is particularly applicable including a pair of I-beam strips 31 and 33. The long dimension of the I-beam strips 31 and 33 is the dimension perpendicular to the plane of the drawing and along this dimension the strips 31 and 33 may have a length of between 30 inches and 100 inches. The other dimensions of the I-beam strips 31 and 33 are as shown in FIG. 1. The web 35 of each strip includes heat-generating material 36.

The heat exchanger includes fluid-cooling fluid channels 38 formed between the strips 31 and 33. The channels 38 are bounded by the webs 35 of the strips and adjacent portions of the flanges 37 of the strips. To form the channels 38 the adjacent flanges must be welded. For adequate mechanical strength, the penetration of the welds must be 100 percent, but erosion of the heat transfer surfaces 39 adjacent to the heat generating material 36 or of the material 36 itself by the penetration of the weld and the deposit of fused material on the heat transfer surfaces 39 or the boundaries of the fluid channel 38 must be avoided. In addition, corrosion of the heat transfer surfaces must be avoided. Further, it is essential that the dimensions of the heat exchanger assembly shall be precisely maintained. To achieve this purpose, channel spacers 41 are inserted in the channels during the welding and annealing operations in welding in accordance with the teachings of the prior art. This invention achieves the object of maintaining the tolerances precisely without the aid of channel spacers and without coating, corroding or eroding the heat transfer surfaces.

The apparatus shown in FIGS. 2, 3, 4 and 15 includes a welding unit, a power supply unit, a control unit and an evacuating unit. This apparatus may be energized from the usual commercial alternating-current supply. This division of the apparatus is on a functional and not structural bases.

The welding unit includes a welding chamber C which is provided with the adequate gasketing and sealing rings so that a relatively high dynamic vacuum may be maintained therein. The chamber C includes a carriage (not shown) for mounting the work W in such a way that it may be moved longitudinally so that a continuous seam may be welded. The work W is moved longitudinally by motor M.

The welding unit also includes an electron beam column E for producing and collimating an electron beam and projecting the beam on the work W. The column E is so disposed with respect to the chamber C that the electron beam is projected in a vacuum onto the work W as the work is moved by the motor M. Motor M1 actuates a mechanism (not shown) to move the electron beam column transversely particularly for M1 welding brackets onto the ends. Additional drives may be provided for turning the work at different angles.

The welding unit also includes a TV camera TC, the receiving screen of which is disposed to view the region in which the welding is being carried out. The camera TC is connected in a closed circuit with a TV viewer TV in the control unit so that the region in which the weld is being made may be viewed by the operator. The inside of the chamber C is lighted by adequate illumination which may be controlled from the control unit.

The power supply unit includes a high voltage power supply HVS for supplying the anode voltage to the electron beam column E and an auxiliary voltage supply AVS for supplying the biasing, alignment and deflecting coils components of the electron beam column. The high voltage power supply HVS and auxiliary voltage power supply AVS are energized from commercial buses of the 440 or 220 volt type through a voltage regulator VR and control circuits in the control unit and an adjustable circuit breaker ACB. The circuit breaker ACB has adjustable overvoltage and overcurrent trip coils and is actuable to disconnect and to deenergize only the high voltage power supply HVS on the occurrence of an overvoltage or an overcurrent. The adjustable circuit breaker ACB operates to deenergize the supply HV when the pressure in the Chamber C reaches 5 microns of mercury. Under such circumstances, the ionization produced causes the adjustable circuit breaker ACB to trip.

The control unit includes the TV viewer TV, high voltage control console HVC, a welding control console WCC, and a control desk CD where the operator may carry out the necessary control operations. The TV viewer TV shows the operator the condition of the region being welded.

The control desk CD is connected to control the evacuating unit, the lighting and the motors M and M1 so that the work may be properly set for welding. The welding control console WCC controls the electron beam column E and the auxiliary voltage supply AVS.

The evacuating unit (FIG. 3) includes valves I, II, III and IV and mechanical pump I AND MECHANICAL PUMP II. Typically, valves I, II and IV are of the 3 inch type and mechanical pump I and mechanical pump II may each be a Kinney KDH-130. Typically valve IV is of 16 inch type. Mechanical pump I is adapted to be connected to the chamber C through valve IV. Between valves I and II, a branch conductor 51 is interposed. An oil diffusion pump and a booster pump are connected between conductor 51 and chamber C through valve III. Typically, the booster pump may be a Kinney KD-150-40 and the oil diffusion pump may be a MCF-5,000 made by Consolidated Electrodynamics Corporation. A refrigeration system is connected to an optical baffle between the oil diffusion pump and valve III to suppress any tendency for oil vapor to backstream into the chamber C. The evacuating unit also includes a manual valve which may be typically of the 3 inch type for bleeding gas into the chamber C when desired.

The evacuation of the chamber C is started with the manual valve and valves I and III closed and valves II and IV open. Mechanical pumps I and II are turned on. When the vacuum in line 51 reaches a suitable point (25 microns) the oil diffusion pump heaters and the booster pump heaters are turned on. After the oil diffusion pump and the booster pump have reached operating conditions and chamber C reaches a suitable point (25 microns) valve IV is closed and valves I and III are opened and II remains open and the evacuating unit pumps out the chamber C. The pumps have been found adequate to maintain a vacuum of between 3 and 0.03 microns pressure or less in the chamber C. During welding the pressure is preferably maintained at less than .03 microns.

The vacuum produced in chamber C by the evacuating unit is dynamic, the pumps being maintained in operation throughout the whole welding process. Thus any gases emitted by the work W are promptly evacuated and there is no tendency for oxidation to deteriorate the weld metal. This is particularly important in the welding of gettering materials such as zirconium and titanium. Such gettering is minimized by the dynamic vacuum.

The electron beam column (FIG. 4) is essentially a cathode-ray device including a heated filamentary cathode K, an anode A having an aperture 60, through which the beam BM passes and a control electrode G in the form of a cup. The electron beam column also includes a diaphragm D1 for restricting the diameter of the beam BM and a positioning diaphragm D2. The positioning diaphragm D2 is a disc having a hole 61 which is centered along the beam by micrometer heads 67 at right angles (only one shown) acting against a spring 65. The electron beam column also includes beam alignment coils BAC1 and BAC2 preferably of the electromagnetic type. These coils are separately energized to control separately the direction of the beam BM. The column also includes a magnetic lens ML for focusing and concentrating the beam and beam deflection coils BDC of the electromagnetic type. By operation of the deflecting coils the beam may be deflected over a region to be welded, for example, in the welding of heat exchangers made up of rectangular strips with side wall spacers interposed (see FIGS. 12a and 12b, 13a and 13b).

The voltages impressed on the electron beam column in a typical situation are presented in FIG. 15. The filament supply may have a potential of 4 volts and may supply 5 amperes through the filament K. The anode A is electrically positive relative to the cathode by 150 kv. The control potential may vary from 0 to minus 1,000 volts DC with respect to the cathode. At minus 1,000 volts, the beam BM is entirely suppressed. The beam alignment coils BAC1 and BAC2 are separately energized. In each case, the voltage may be varied from 0 to 80 DC and the current flow to the coils may be of either polarity. Thus a wide range of beam alignment is achieved. The magnetic lens potential is of the direct-current type and may vary from 120 to 1,225 volts positive. When the beam BM is deflected for the purpose of welding a sidewall spacer between two strips, the beam deflection voltage is typically of the alternating current 60-cycle type and may be varied between zero and an upper limit extending up to 34 volts, depending on the extent of the deflection.

The region being welded may be viewed by the TV camera TC. The light from this region is projected onto the camera by a reflector 71. Because the TV camera views the region being welded indirectly through the reflector, the molten particles from the region do not impinge on the lens of the camera.

Figure 2:
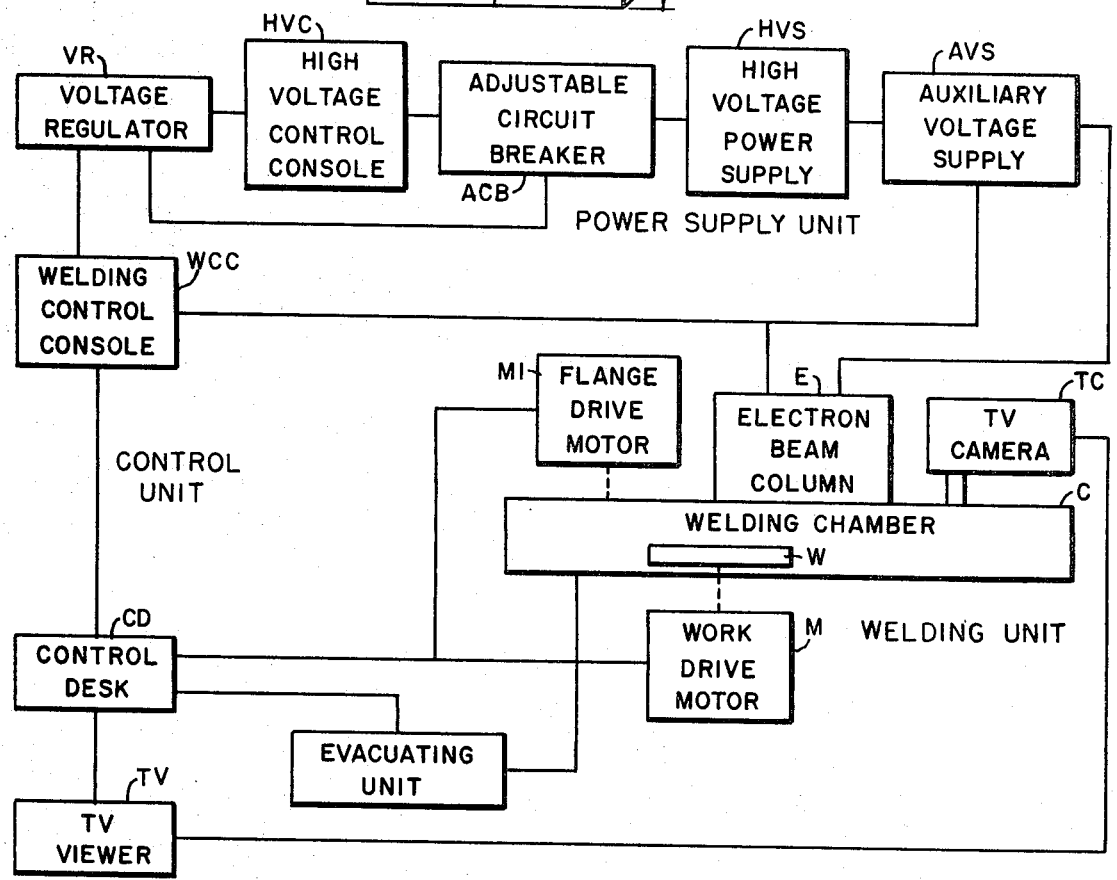
FIG. 2 is a block diagram showing the important components of apparatus for practicing this invention.
Figure 3:
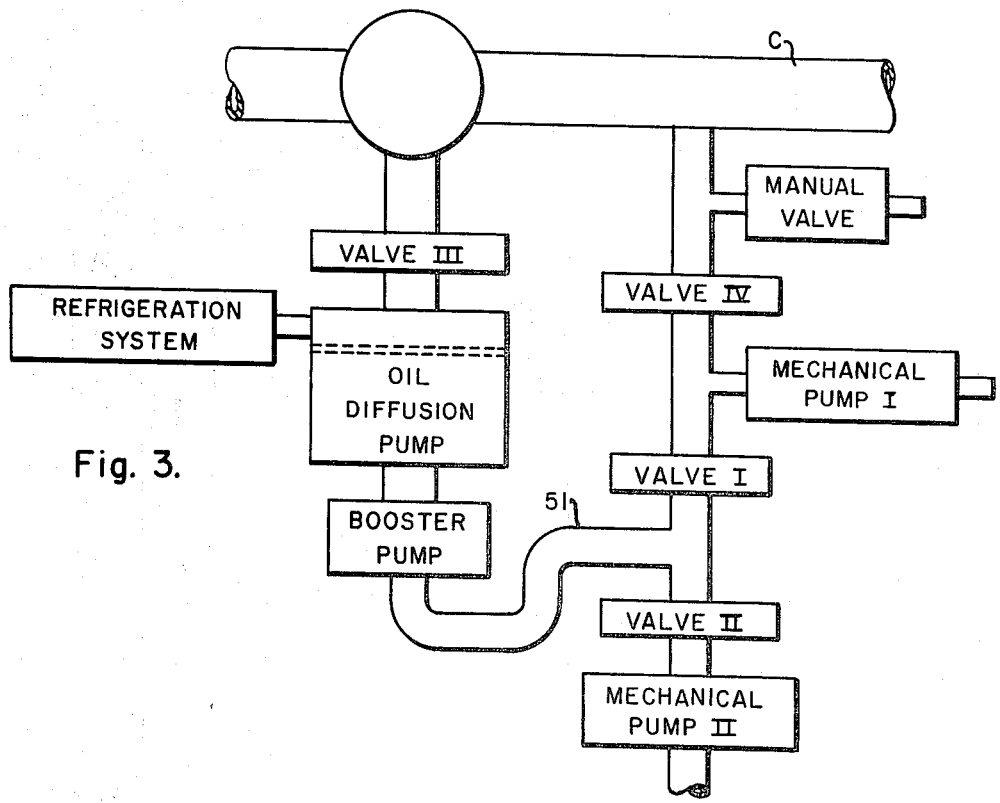
FIG. 3 is a block diagram showing the evacuating system of the apparatus shown in FIG. 2 with which a low-pressure dynamic vacuum is maintained.

In fabricating a heat exchanger from I-beam strips with the apparatus described in FIGS. 2 through 4, the following steps were followed:

1. The number of I-beam strips (31, 33 FIG. 1) necessary to produce a heat exchanger having the number of fluid channels (38) desired are assembled.
2. The strips and any mounting brackets are thoroughly cleaned with acetone and alcohol.
3. The strips are assembled between 90° angle plates in the position in which their flanges and webs define the fluid channels. When so assembled, the strips are firmly clamped.
4. The strip assembly as just disclosed is mounted in the chamber C with the end brackets mounted on the strip assembly.
5. The assembly is placed in the chamber C and the chamber is sealed and evacuated to a pressure of .03 microns or less.
6. The electron beam column is energized and the assembly as mounted is tack welded, the end brackets being tack welded to the ends of the assembly. The tack-welded assembly is cooled for the proper time interval and removed from the chamber and the clamping brackets are disengaged. (The assembly may also be mounted in such a way as not to necessitate removal from the chamber at this point.)
7. The tack-welded assembly is positioned in the chamber C and one of the seams of the assembly is aligned for welding.
8. The chamber is evacuated to .03 microns of mercury or less.
9. The electron beam column is energized and the beam aligning coils BAC1 and BAC2 are energized so as to align the beam on the start of the seam. The coil ML is properly energized to focus the beam. It is desired that the diameter of the cross section of the beam on the seam be relatively small, of the order of 0.010 inch. The setting of the beam on the seam may be effected with the aid of the closed television system TC, TV.
10. After the beam is aligned and concentrated on the start of the seam the welding operation is carried out by advancing the work W or moving the column E so that the seam passes under the electron beam. When the work is thick the beam may be oscillated back and forth over the seam. The operator watches the operation in the closed circuit TV viewer, TV.
11. Upon completion of the welding operation, the assembly is cooled and removed from the chamber C.

Figure 5A:
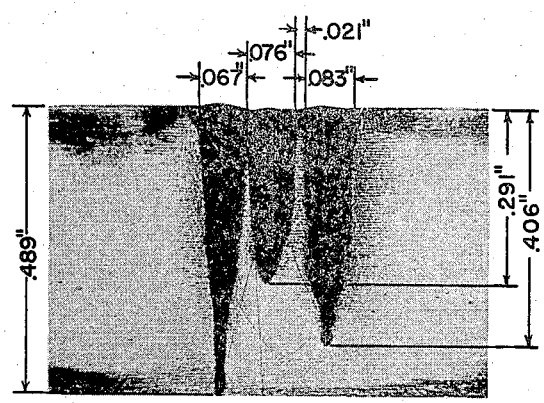
FIGS. 5a and 5b are photographs of welds made in work or ZIRCALOY-2 alloy in the practice of this invention.

FIG. 5a is a photograph showing the capabilities of the method in accordance with this invention. FIG. 5a shows three electron beam welds made side-by-side in a block of ZIRCALOY-2 alloy by practicing this invention. These welds are labeled 1, 2 and 3. All welds were made with a 2 kilowatt, 150 kilovolt electron beam column. Weld No. 1 was made in 150 kilovolts, 13 milliamperes with the rate of fusion 10 inches per minute; weld No. 2 at 150 kilovolts, 8 milliamperes and 10 inches per minute; and weld No. 3 at 150 kilovolts, 13 milliamperes and 10 inches per minute. The photograph in FIG. 5a is of the fractured surface.

It is seen that the welds are highly penetrating, their width being substantially less than 1/10 inch to 5/10 inch. Weld No. 3 for which higher current was used has a higher depth-to-width ratio than the others.

Figure 5B:
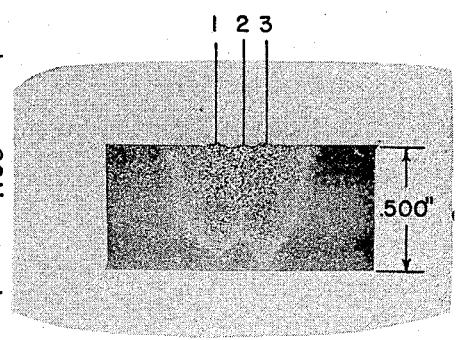

FIG. 5b is a polished and etched photomicrograph of Welds 1, 2 and 3. The photograph of the etched specimen reveals the heat-affected zones adjacent the fusion zones and does not distinguish between them.

Figure 6A:
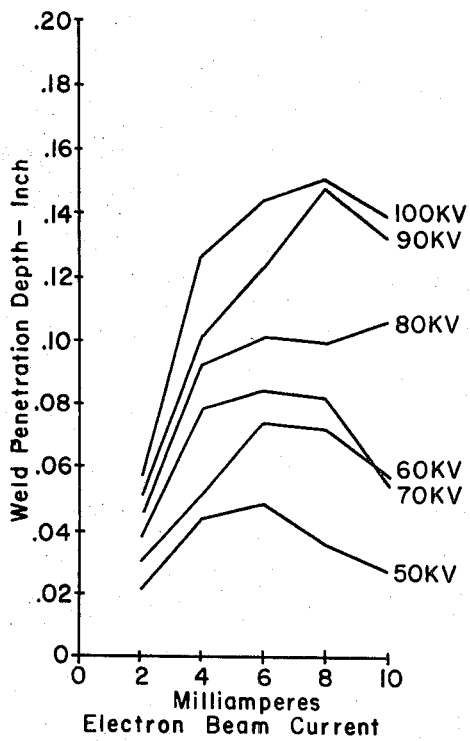
FIG. 6a is a graph showing the relationship between the depth of a weld and the electron beam current for a number of welds produced ZIRCALOY-2 work or ZIRCALOY2 alloy.
Figure 6B:
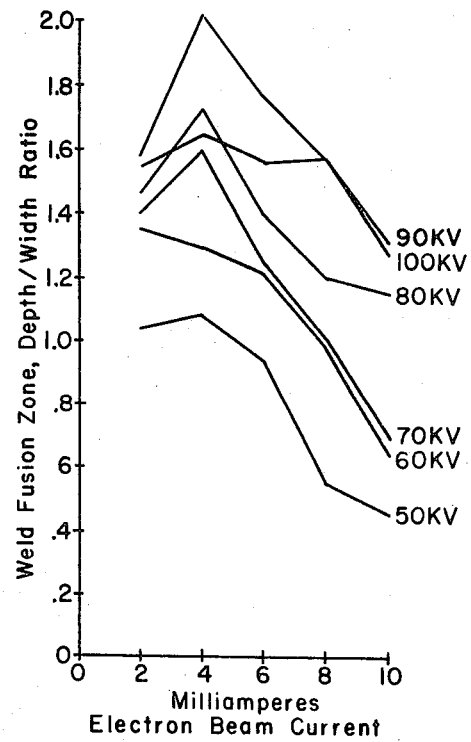
FIG. 6b is a graph showing the relationship between the depth-to-width ratio and the electron-beam current of a number of welds made in work or ZIRCALOY-2 alloy.

FIG. 6a shows the penetration in inches as a function of the electron beam current for a number of welds made in accordance with this invention in ZIRCALOY-2 alloy at different electron beam voltages. Depth is plotted vertically and current horizontally. The beam voltages are indicated on the right of the curves. FIG. 6a shows that the depth increases substantially as the beam voltage increases. FIG. 6b shows the depth-to-width ratio for the same welds as a function of the current. The depth-to-width ratio is also seen to increase substantially as the beam voltage increases. There is a sharp decrease in the depth-to-width ratio as the beam current increases above about 4 milliamperes.

Figure 7A:
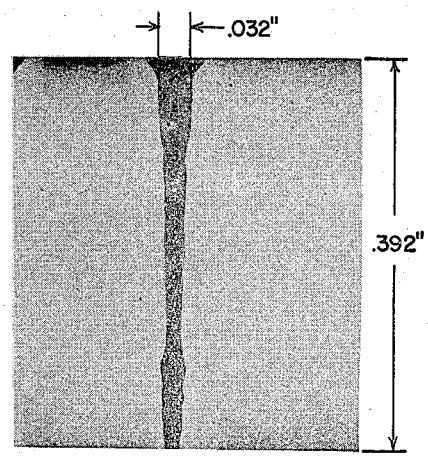
FIGS. 7a and 7b are a photomicrograph and a photomacrograph, respectively, of a weld in austenitic stainless steel made in the practice of this invention.
Figure 7B:
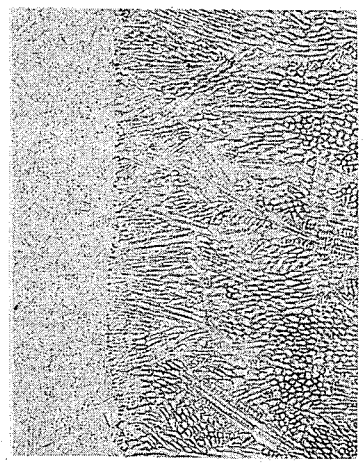

FIGS. 7a and 7b are respectively a photomacrograph and a photomicrograph of a weld in austenitic stainless steel ASAE-No. 304 made practicing this invention with a 2 kilowatt 150 kilovolt electron beam column. In making this weld, the column operated at 140 kilovolts and 10 milliamperes and the weld was produced at a rate of 14 inches per minute. The photomicrograph, FIG. 7b, shows a sharp demarcation between the weld fusion zone on the right and the base metal on the left. This sharp demarcation is characteristic of welds made by electron-beam welding. The high depth-to-width ratio is illustrated in FIG. 7a and is seen to exceed 12 to 1. The photomicrograph is a 250 magnification.

Figure 8:
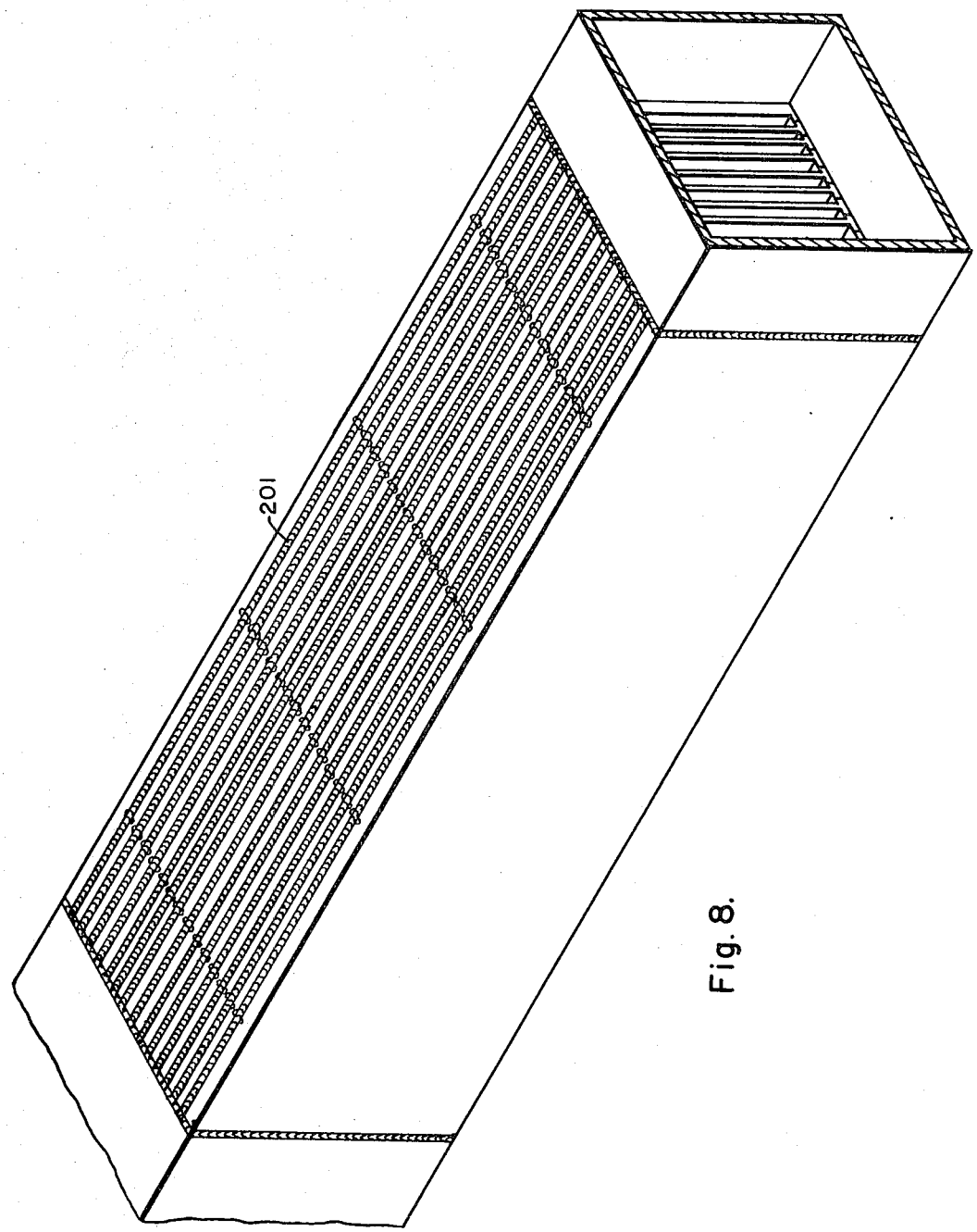
FIG. 8 is a photograph of a heat exchanger made in the practice of this invention.

FIG. 8 is a photograph showing the welds produced by electron-beam welding in accordance with this invention on one side of an electron beam welded heat exchanger of the type described above. The sharpness of the seams 201 demonstrate the advantages of this invention.

Figure 9:
FIG. 9 is a photomacrograph of a section of a prototype of a heat exchanger made in the practice of this invention showing the welded joints.

FIG. 9 shows a photomacrograph of a polished and etched sidewall cross section of a prototype of a heat exchanger which was welded by the method in accordance with this invention. It is seen that narrow welds were produced, and that these welds penetrated through the joint but did not penetrate to the heat transfer surfaces 203. In the structure corresponding to FIG. 9, the flange thickness was .220 inch, the flange width .100 inch and the web thickness .150 inch.

Figure 10:
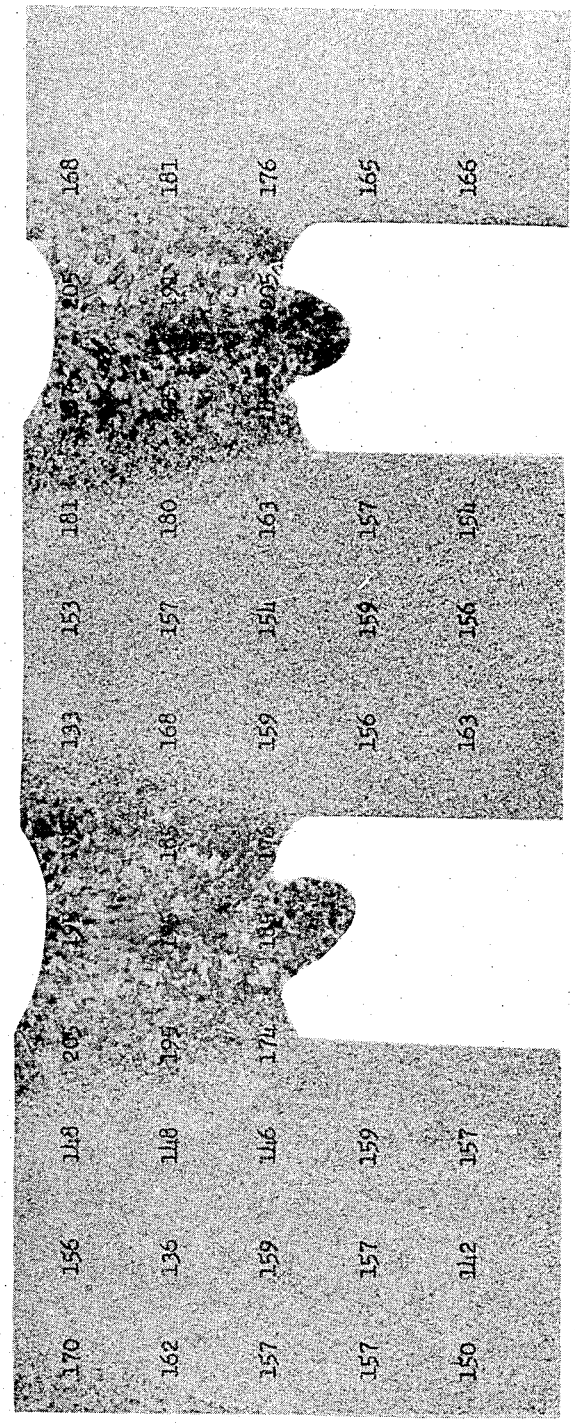
FIG. 10 is a photomacrograph of a portion of the section shown in FIG. 9 showing the hardness of the various portions of the joint and the adjacent material.

FIG. 10 is a photomacrograph of a section of the weld shown in FIG. 9 showing the results of a survey of the hardness of the weld material, the heat-affected zone and the base material. The weld material is substantially harder than the base material. The hardness is given in Diamond Period Numbers (DPN) with the load 1 kilogram.

Figure 11A:
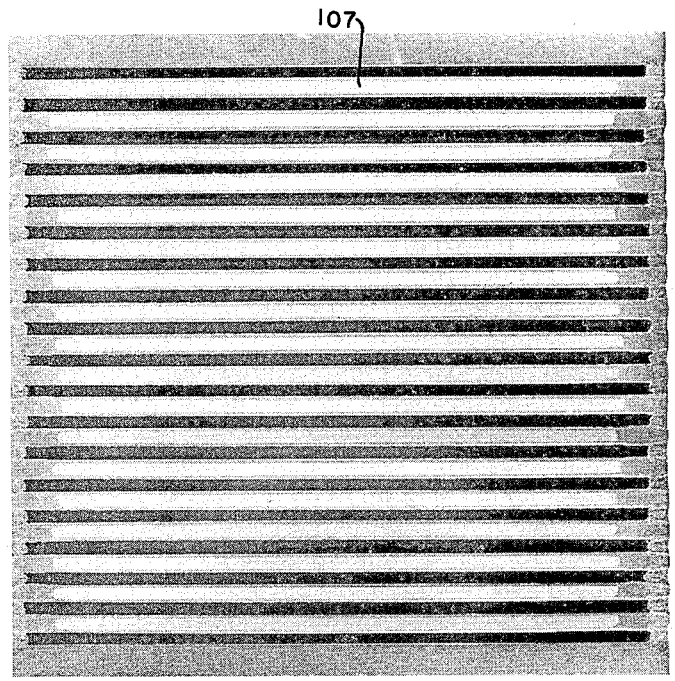
FIG. 11a is a photograph showing a section through a heat exchanger made in the practice of this invention.
Figure 11B:
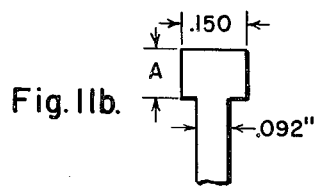

FIG. 11a is a photograph of a polished and etched section of a heat exchanger welded in accordance with this invention. The dimensions of the I-beam strips are shown in FIG. 11b. The length of the flange identified by the letter A was .100 for most of the strips and .135 for certain of the strips. In FIG. 11a, the defined central portions in the strips 107 constitute the heat-generating material within the webs of the I-beam strips. It is seen that the welds do not affect either the heat-generating material or the transfer surfaces. The welds for the heat exchanger shown in FIG. 11a were made with an electron beam at a half-kilowatt beam power at the rate of 20 inches per minute. FIG. 11a shows that with the welding in accordance with this invention, the quantity of heat-generating material in each of the strips may be substantially increased since the welds are precisely controlled.

Figure 12A:
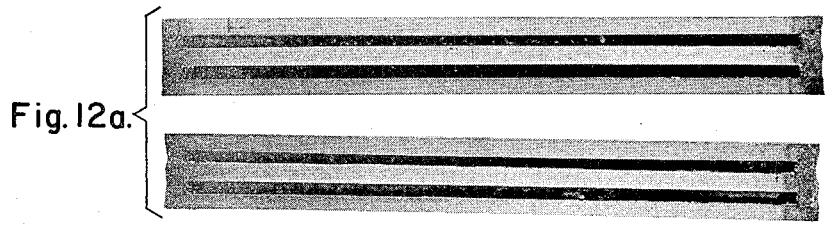
FIG. 12a is a fragmental view showing a heat exchanger composed of strips and spacers made in the practice of this invention.
Figure 12B:
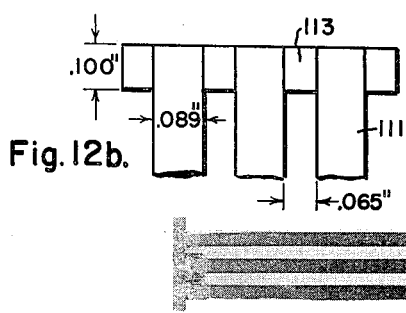

FIG. 12a shows portions of a heat transfer prototype assembly consisting of strips 111 between which sidewall spacers 113 are interposed. The dimensions of the strips and spacers are shown in FIG. 12b. FIGS. 12a and 12b show that a highly precise heat exchanger may be produced by using rectangular strips 111 and sidewall spacers 113 instead of I-beam strips.

Figure 13B:
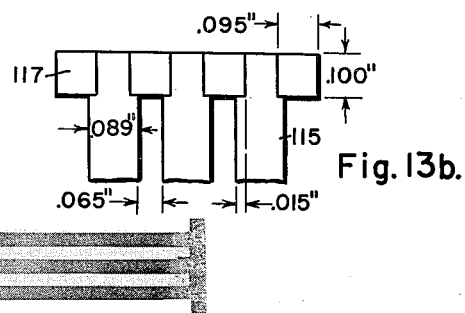
FIGS. 13a and 13b are a respectively fragmental view similar to FIG. 12a and a photograph similar to FIG. 12b for a heat exchanger made up of strips and spacers in the practice of this invention.
Figure 13A:
Figure 14A:
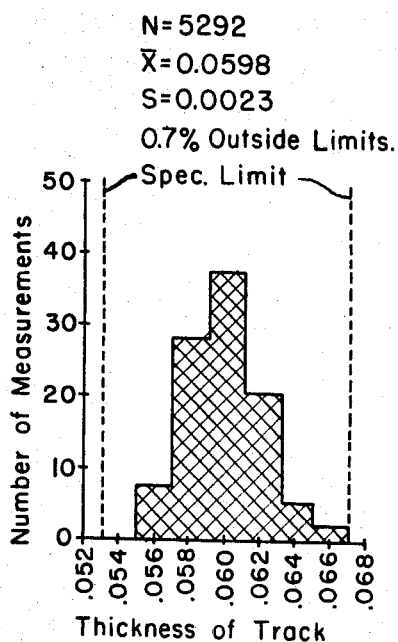
Figure 14B:
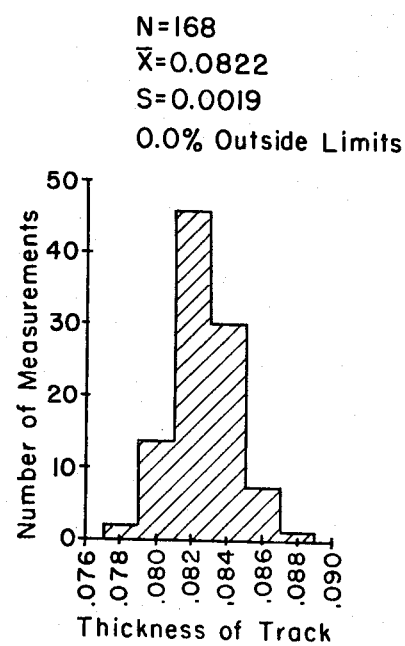
Figure 14C:
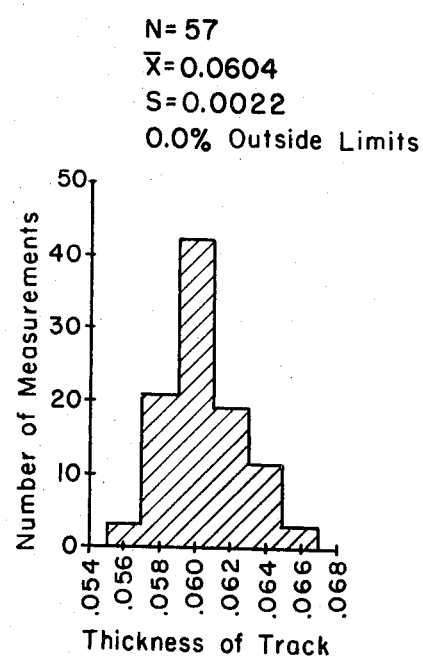
Figure 14D:
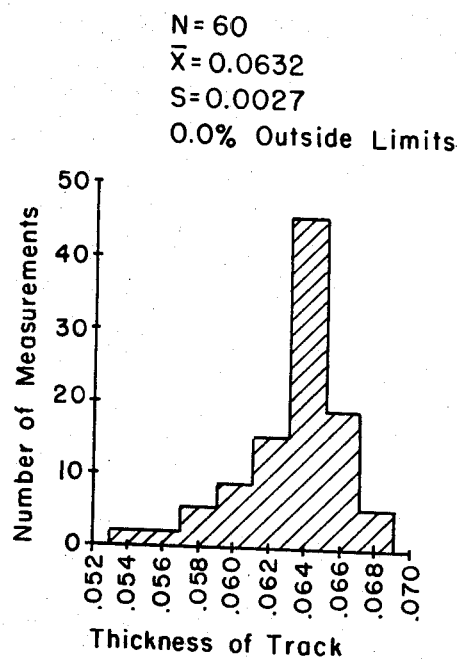
Figure 14E:
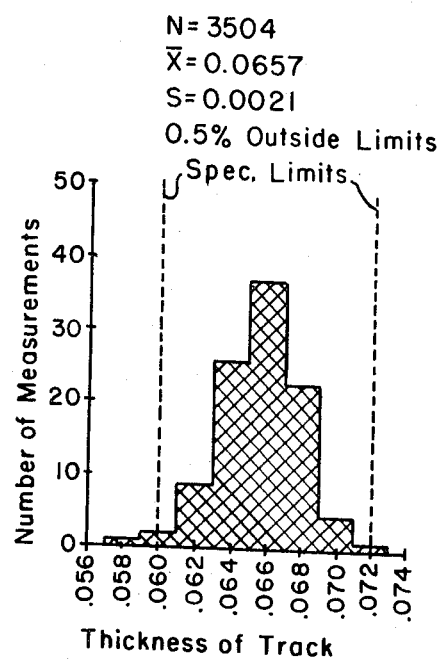

FIGS. 13a and 13b show a heat exchanger assembly in which the strips 115 are provided with shoulders at their ends and the sidewall spacers 117 are seated in the shoulders. The heat exchanger assembly shown in FIGS. 13a and 13b also appears satisfactory.

In making the assemblies shown in FIGS. 12a, 12b, 13a, 13b, the beam is aligned with the center of the sidewall spacer 113 (or 117) and then is moved along the sidewall spacer while being oscillated transversely to the seam (direction of movement) preferably by control of the coils BDC (FIG. 4). The electron beam should pass over both boundaries between the sidewall spacer 113 (or 117) and the strips 111 (or 115) during each oscillation. The sidewall spacers and strips are fused into heat exchanger assemblies in this way.

Instead of oscillating the beam over the sidewall spacers, the beam may in accordance with the broader aspects of this invention be oscillated over the ends of the strips 111 (or 115) or the beam may be moved along the seams without oscillators.

FIGS. 14a through 14e are charts summarizing the advantages of this invention. This chart shows the distribution of channel widths as a function of a number of measurements made for a number of heat exchangers. Number is plotted vertically and channel width in inches is plotted horizontally. Above each chart, the following data is presented:

N—the number of tracks.
X—the average width for all tracks except where otherwise noted.
S—the root-mean-square of the deviation for the different channels from the average.
The percent deviation beyond the limits.

Charts 14a and 14e were derived from heat exchangers made by the nonconsumable-electrode method. It is seen that 7/10 percent of the measurements were outside of the limits specified .060 ± .007 inch in the case of Chart 14a. In the case of Chart 14e, .5 percent of the measurements were outside of the limits.

Chart 14b corresponds to a prototype of a heat exchanger composed of ZIRCALOY-2 alloy and welded in accordance with this invention. In this case, the root-mean-square of the deviation was only .0019 as compared to .0023 and .0021 in the case of the nonconsumable electrode unit and there were no measurements outside of the limits.

Chart 14c corresponds to a heat exchanger made by combining strips and spacers as shown in FIGS. 12a and 12b and 13a and 13b, but using solid strips (11 or 15) of ZIRCALOY-2 alloy. In this case again, there were no measurements outside of the limits. The heat exchanger assembly corresponding to chart 14c was produced in accordance with this invention.

Chart 14d corresponds to a heat exchanger assembly including strips with heat generating elements and made in the practice of this invention. In this case, there were a small percentage of measurements outside of the limits but most of the measurements were concentrated over a very small range.

While preferred embodiments of this invention have been disclosed herein, many modifications thereof are feasible. This invention then is not to be limited except insofar as is necessitated by the spirit of the prior art.

We claim:

1. The method of producing an array of channels, contiguous channels being separated by a relatively small distance of the order of .1 inches, the said method comprising forming an assembly consisting of strips separated by spacers, each of said strips bounding a channel on each side thereof and constituting sidewalls, for said channels on each side thereof, the wall thickness of each said strip between said last-named channels being less than about .1 inches, each strip and its contiguous spacers forming a pair of joints to be welded, said joints being less than about .1 inches apart, maintaining said assembly at low pressure less than about 5 microns of mercury, projecting a narrow beam of electrons near said pair of joints, oscillating said beam back and forth over each of said joints in turn transversely of the strip defining said joints in fusing relationship with said joints so that said beam as it oscillates periodically overlaps successively first one of said pair of joints and then the other of said pair, and advancing said beam longitudinally to the ends of each of said last-named strip, said beam being advanced at a rate such that said spacers are welded to said last-named strip to form a mechanically strong bond.

2. The method of producing an array of channels, contiguous channels being separated by relatively small distances of the order of .1 inches, the said method comprising forming an assembly consisting of strips separated by spacers, each of said strips bounding a channel on each side thereof, the thickness of each said strip between said last-named channels being less than about .1 inches, each strip and its contiguous spacers forming a pair of joints to be welded less than about .1 inches apart, maintaining said assembly at low pressure less than 5 microns of mercury, producing a beam of electrons, focusing said beam of electrons near said pair of joints formed by each of said strips, the cross section of said beam near said strips where said beam is focused being as small as practicable, and being substantially smaller than the said spacing between said joints, and advancing said beam longitudinally of the ends of each of said strips near each of said pair of joints in its turn, in fusing relationship with said joints, said beam being advanced at a rate such that said spacers are welded to said strips to form a fluid-tight seal.

3. The method of producing fusion zones of joints of work, the spacing between adjacent of said joints being small, the said method comprising producing a cloud of electrons, impressing on said electrons an accelerating voltage to produce a beam of electrons, projecting on said work, in fusing relationship with each of said joints in its turn, a beam of electrons concentrated near each of said joint in its turn, said beam having a diameter of about .01 inches near said joint, oscillating said beam while so concentrated back and forth over each of said joints in its turn while advancing said beam relative to said last-named joint to produce said zone along each said joint in its turn, the current of said beam being so related to said accelerating voltage that the desired high depth-to-width ratio of the fusion zone at each said joint is obtained.